(12) United States Patent
Ugusa et al.

(10) Patent No.: US 6,480,772 B1
(45) Date of Patent: Nov. 12, 2002

(54) VEHICLE CRASH DETERMINING APPARATUS

(75) Inventors: Aki Ugusa, Tokyo (JP); Toshiyuki Yamashita, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/987,056

(22) Filed: Nov. 13, 2001

(30) Foreign Application Priority Data

Jul. 31, 2001 (JP) ........................................ 2001-232328

(51) Int. Cl.$^7$ ................................................ G06F 7/00
(52) U.S. Cl. ......................... 701/46; 701/45; 280/734; 280/735; 180/271; 180/282; 340/438
(58) Field of Search ............................... 701/45, 46, 36; 280/728.1, 734, 735; 307/9.1; 180/232, 271, 282; 340/438

(56) References Cited

U.S. PATENT DOCUMENTS 5,508,918 A * 4/1996 Giuotsos ................ 364/424.05

FOREIGN PATENT DOCUMENTS

JP           63-275959         11/1988          ........... G01P/15/00

* cited by examiner

Primary Examiner—Yonel Beaulieu
(74) Attorney, Agent, or Firm—Sughrue Mion, PLLC

(57) ABSTRACT

A discrimination is made between a soft crashing in which a relatively low acceleration signal continues for a long period of time and a low-speed head-on crashing so that an air bag can be started at an appropriate timing. An occupant protecting apparatus for that purpose is made up of: a first comparator for comparing an output signal of an acceleration sensor which detects an impact at the time of crashing of a vehicle and a first threshold value; a second comparator for comparing an integrated value of an integrator which integrates an output of the first comparator within a predetermined section and a second threshold value while making a shift by a unit time within a predetermined section; and a starting device for controlling the starting of the air bag based on an output signal of the second comparator.

5 Claims, 10 Drawing Sheets

VEHICLE CRASH DETERMINING APPARATUS

BACKGROUND OF THE INVENTION

1. Field of the Invention

The present invention relates to a vehicle crash determining apparatus which controls the starting of an occupant protection means such as an air bag apparatus, a belt pretensioning apparatus or the like which protects the occupants in a vehicle compartment at the time of a vehicle crash.

2. Description of Related Art

FIG. 11 is a plan view showing a state in which a vehicle crash determining means 102 of an occupant protection apparatus is disposed inside a vehicle 101. FIG. 12 is a schematic diagram showing an arrangement of the crash determining means 102 and an occupant protection means 102 has an acceleration sensor 102a, a microcomputer 102b and a starting means 102c. The occupant protection means 103 which is described as an example of an air bag that has a squib (a detonator) 103a which receives an output of the starting means 102c, and an air bag 103b which is inflated upon receipt of the output of the squib 103a.

A description will now be made about the operation of the above-described arrangement.

The acceleration sensor 102 detects an acceleration due to crashing and outputs an electric signal corresponding to the magnitude of the acceleration. The outputted electric signal is processed as a digital signal through operation by an analog/digital (A/D) converting means. The microcomputer 102b integrates the inputted electric signal by an internally disposed integrating means which is disposed therein with respect to a predetermined section (a predetermined time width). If this integrated value has exceeded a predetermined threshold value, i.e., if a vehicle crash in which the air bag 103b should be started or operated has happened, a determination is made that the crash corresponds to a crash in which "the starting of the occupant protection means is necessary."

If a determination is made that there has happened a crash in which the air bag 103b should be operated, the starting means 102c is started by the output of the microcomputer 102b. This starting means 102c causes an electric current to flow through the squib 103a, whereby the air bag 103b is operated.

The conventional vehicle crash determining apparatus performs the function of only integrating the acceleration signal detected by the acceleration sensor with respect to the predetermined section. Therefore, in a soft crashing such as an offset crashing or an underride crashing as shown in FIG. 14A, acceleration signals relatively smaller than those in a head-on crashing as shown in FIG. 13A will be continuously outputted for a long period of time. The occupant protection apparatus should ordinarily be operated within this section. However, in case a discrimination is made based on the integrated value between the low-speed head-on crashing and the soft crashing, the predetermined time must be set considerably long as shown in FIGS. 13B and 14B. It follows that the determination for starting the occupant protection apparatus takes a long time. There is therefore a problem in that the occupant protection apparatus cannot be started at an appropriate timing.

This invention has been made in order to solve the above-described problem or the like and has an object of providing a vehicle crash determining apparatus in which a discrimination can be made at a short time between a soft crashing in which relatively smaller acceleration signals last for a long period of time and a low-speed head-on crashing, whereby the occupant protection means can be started at an appropriate timing.

SUMMARY OF THE INVENTION

In order to attain the above and other objects, this invention provides a vehicle crash determining apparatus comprising: a first comparing means for comparing an output signal of an acceleration sensor for detecting an impact at a time of crashing of a vehicle with a first threshold value; a second comparing means for determining a necessity of starting an occupant protection means by comparing an accumulated value of an integrating means for accumulating an output of the first comparing means within a predetermined section while making a shift by a unit time with a second threshold value; and a starting means for controlling a starting of the occupant protection means based on an output signal of the second comparing means.

According to another aspect of this invention, there is provided a vehicle crash determining apparatus comprising: a first comparing means for comparing an output signal of the acceleration sensor for detecting an impact at a time of crashing of a vehicle with a first threshold value; a subtracting means for subtracting a predetermined constant value from an output of the first comparing means; an integrating means with a reset function for integrating an output of the subtracting means to thereby forcibly reset an integrated value thus obtained to zero when the integrated value falls below zero; a second comparing means for determining a necessity of starting an occupant protection means by comparing the integrated value of the integrating means and a second threshold value; and a starting means for controlling a starting of the occupant protection means based on an output signal of the second comparing means.

Preferably, the apparatus of this invention may further comprise attenuating means for attenuating a high-frequency component in the output signal from the acceleration sensor to thereby input a resultant product into the first comparing means.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENTS

Preferred embodiments of this invention will now be described.

Embodiment 1

Figure 1:
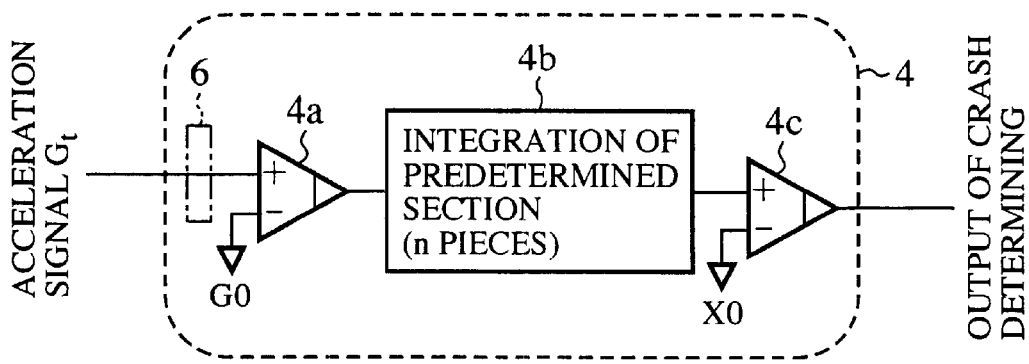
FIG. 1 is a block diagram showing an arrangement of a vehicle crash determining means in embodiment 1 according to this invention.

FIG. 1 shows a schematic diagram of an important portion of a vehicle crash determining apparatus according to embodiment 1 of this invention. In the figure, reference numeral 4 denotes a crash determining means which corresponds to the microcomputer shown in FIG. 12. This means 4 is made up of: a first comparing means 4a which receives an input in the form of an acceleration signal Gt from an acceleration sensor for detecting an impact at the time of crashing of a vehicle to thereby compare the accelerating signal Gt with a first threshold value G0; an integrating means 4b which integrates an output signal of the first comparing means 4a within a predetermined section T while making a shift by a unit time t; and a second comparing means 4c which compares the integrated value of the above integrating means 4 with a second threshold value X0 to thereby determine as to whether the occupant protection means should be started or not.

A description will now be made about the operation of the above arrangement.

Figure 2:
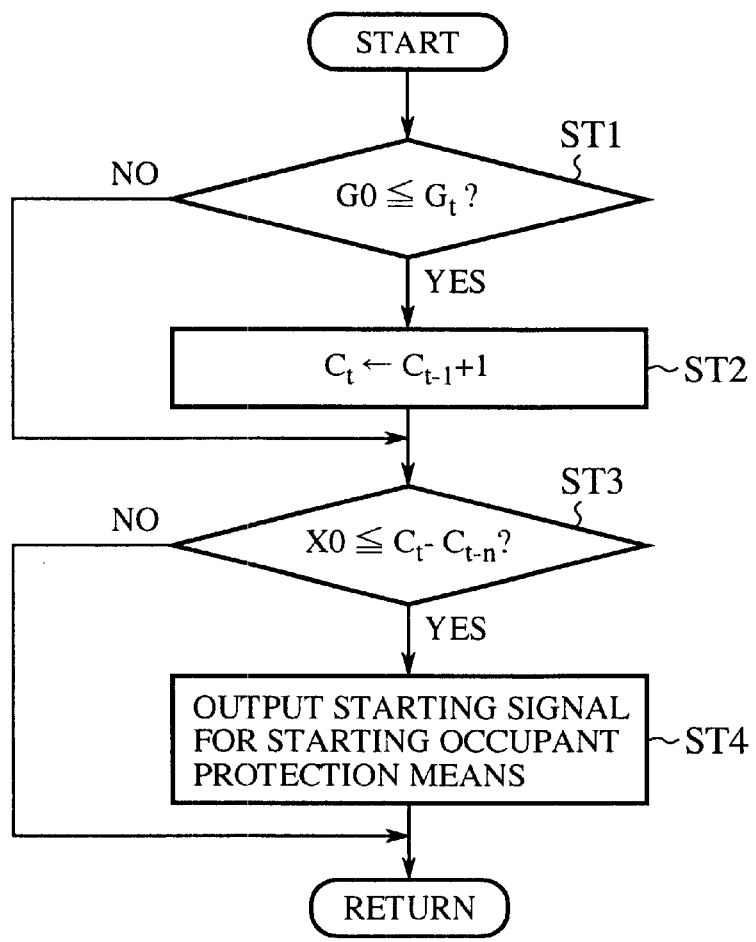
FIG. 2 is a flow chart showing an operating process in the vehicle crash determining means.

An operating process of the crash determining means 4 is described with reference to the flow chart shown in FIG. 2. At step ST1, a determination is made by the first comparing means 4a as to whether the acceleration signal Gt at the time of detection by the acceleration sensor is equal to or larger than the first threshold value G0 or not. If the result of comparison is in the affirmative (YES), the number $C_{t-1}+1$ is incremented to $C_t$ at step ST2.

At step ST3, the number $(C_t-C_{t-n})$ in which the acceleration signal Gt within the predetermined section T exceeds the first threshold value G0 is compared by the second comparing means 4c with the second threshold value X0. If the number $(C_t-C_{t-n})$ is equal to or larger than the second threshold value X0, the program proceeds to step ST4, at which a starting signal for starting the occupant protection means is outputted as a result of crash determination by the second comparing means 4c.

Figure 3A:
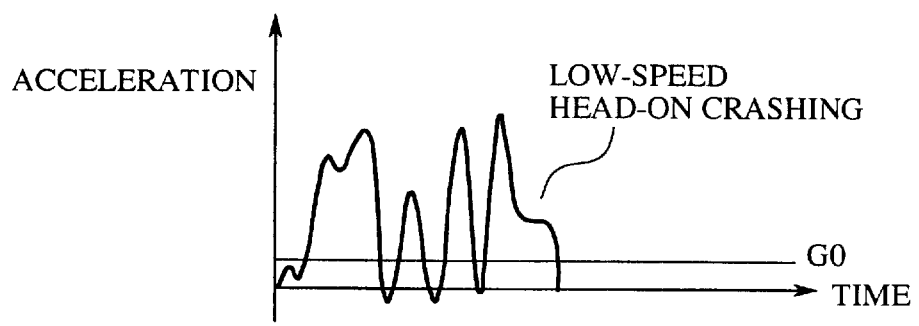
FIG. 3A is a graph showing the waveform of an acceleration signal and FIGS. 3B and 3C are waveforms at respective outputs in FIG. 1 at the time of low-speed head-on crashing.
Figure 3B:
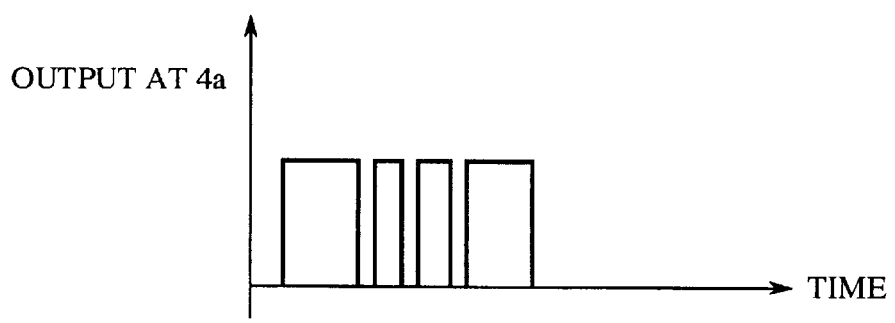
Figure 3C:
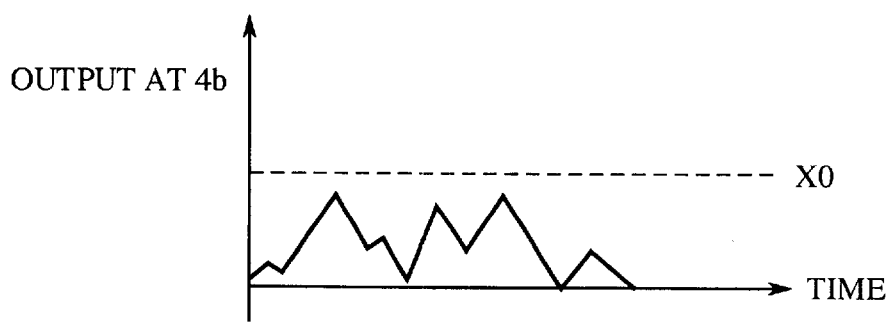
Figure 4A:
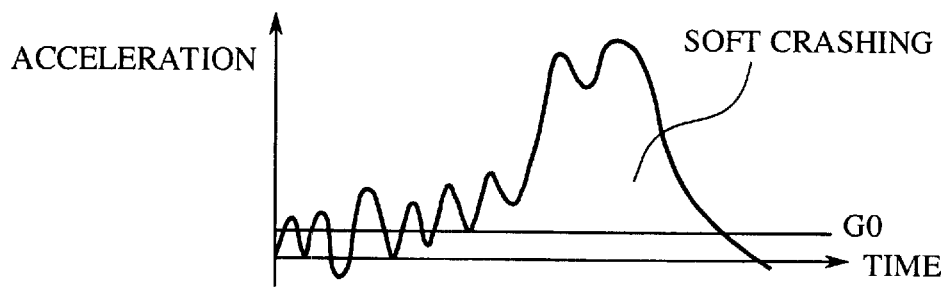
FIG. 4A is a graph showing the waveform of an acceleration signal and FIGS. 4B and 4C are waveforms at respective outputs in FIG. 1 at the time of soft crashing.
Figure 4B:
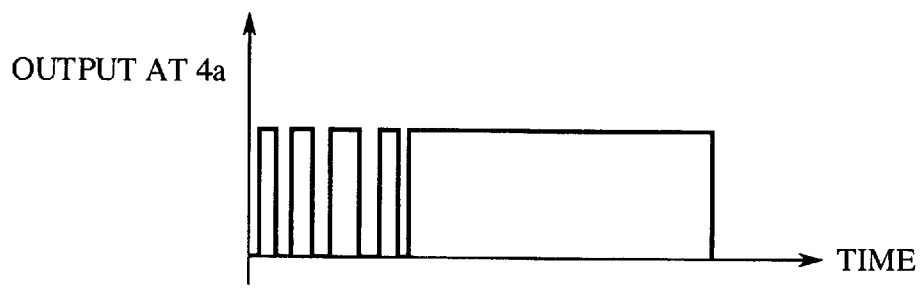
Figure 4C:
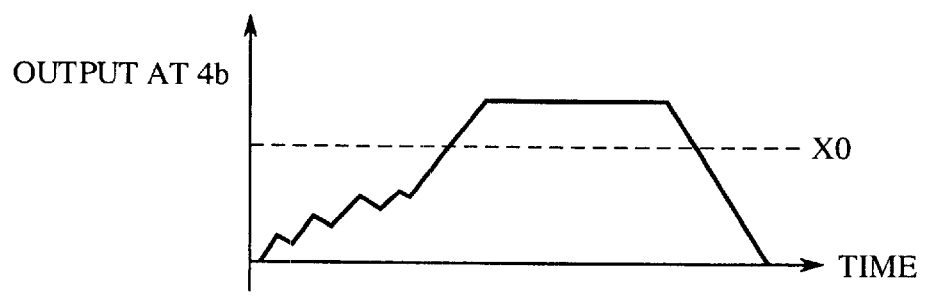
Figure 5A:
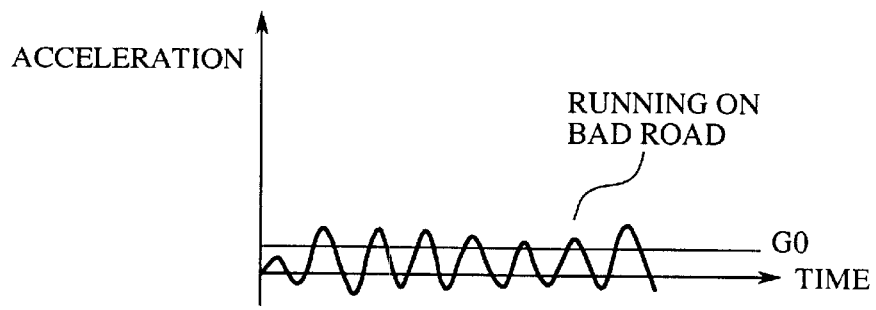
FIG. 5A is a graph showing the waveform of an acceleration signal and FIGS. 5B and 5C are waveforms at respective outputs in FIG. 1 at the time of running on a bad road.
Figure 5B:
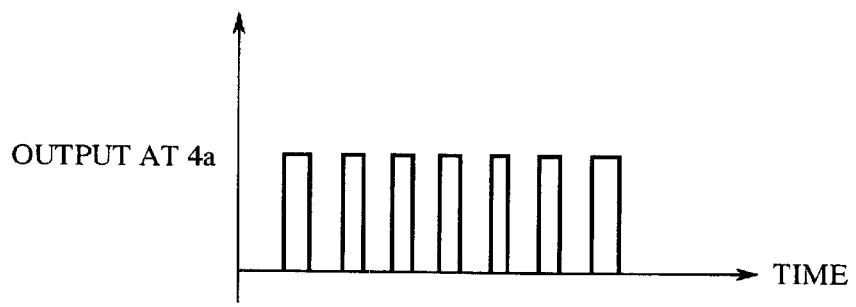
Figure 5C:
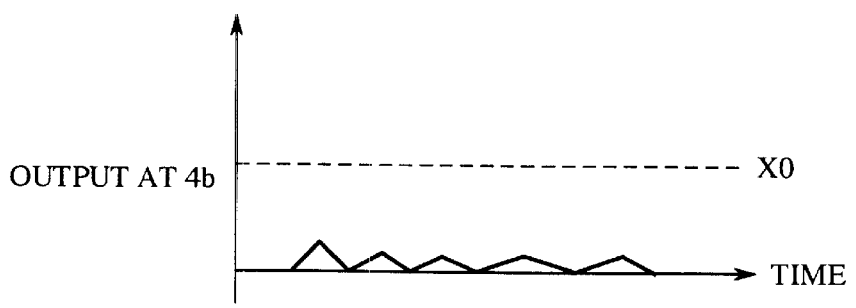

FIGS. 3, 4 and 5 show the waveforms of the acceleration signals and output waveforms at each of points 4a, 4b in FIG. 1 at the time of low-speed head-on crashing, soft crashing, and running on a bad road, respectively. By integrating the time in which the acceleration signal Gt exceeds the first threshold value G0, it is possible to quickly discriminate between the low-speed head-on crashing and the soft crashing. Further, if the first threshold value G0 is set to a value taking into consideration a braking or running on a bad road for a long period of time, noises in the acceleration sensor, or the like, it is possible to prevent the wrong actuation (inflation of an air bag, or the like) when the starting of the occupant protection means is not necessary.

Embodiment 2

Figure 6:
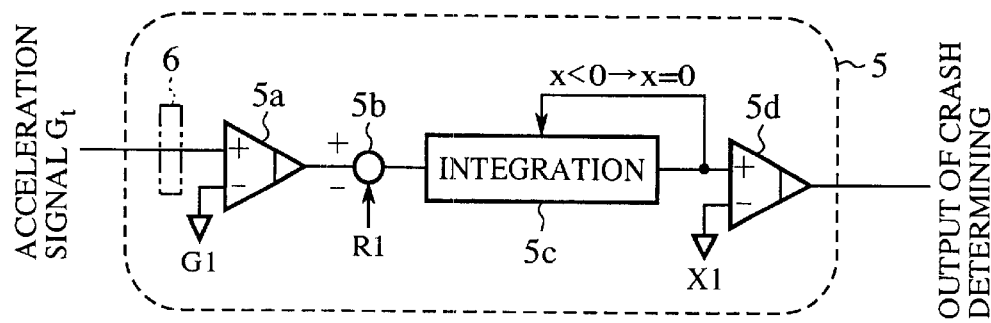
FIG. 6 is a block diagram showing an arrangement of an occupant protection means in embodiment 2 according to this invention.
Figure 7A:
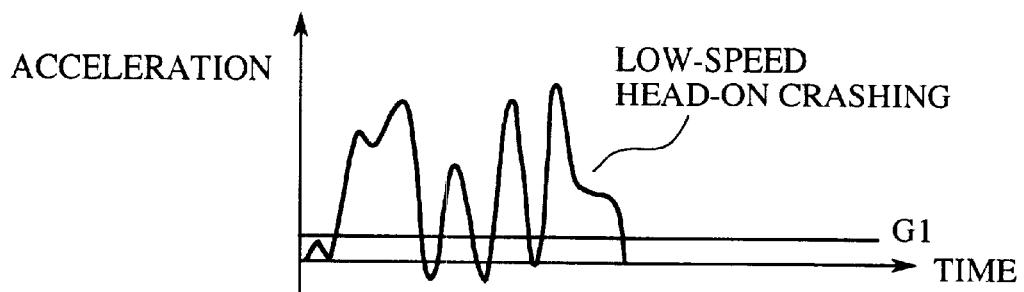
FIG. 7A is a graph showing the waveform of an acceleration signal and FIGS. 7B through 7D are waveforms at respective outputs in FIG. 6 at the time of low-speed head-on crashing.
Figure 7B:
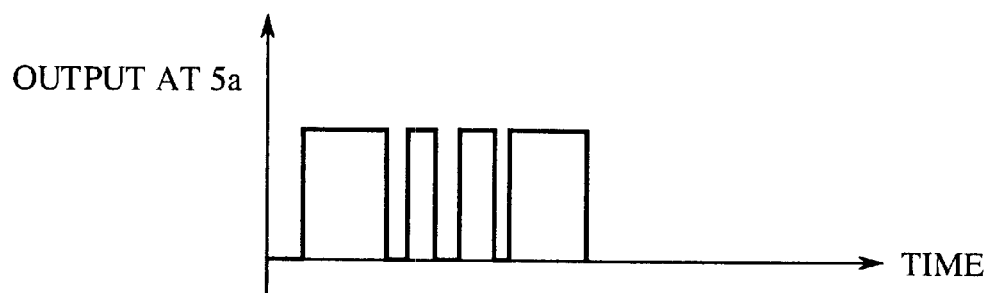
Figure 7C:
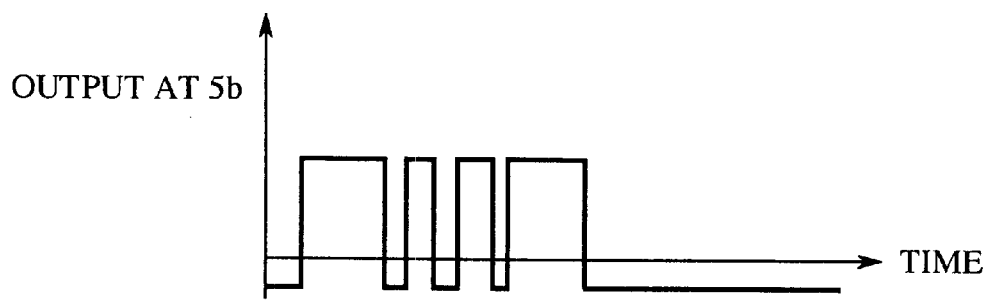
Figure 7D:
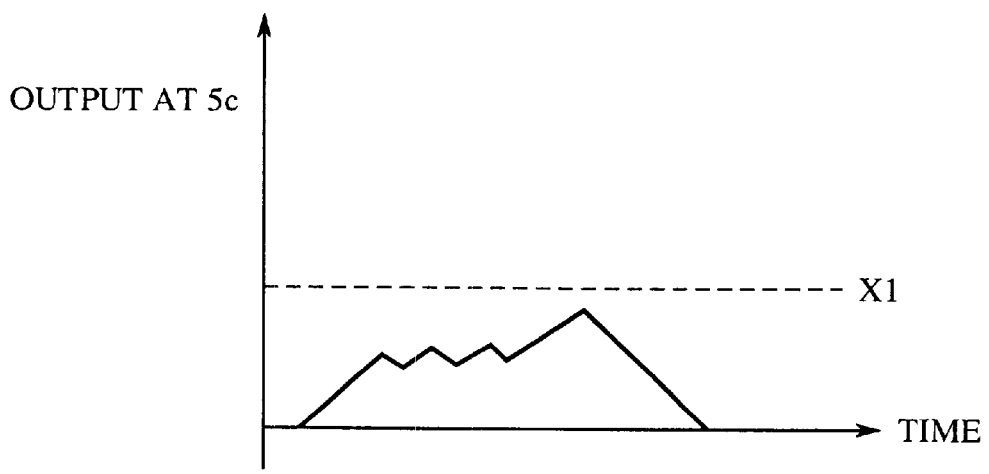
Figure 8A:
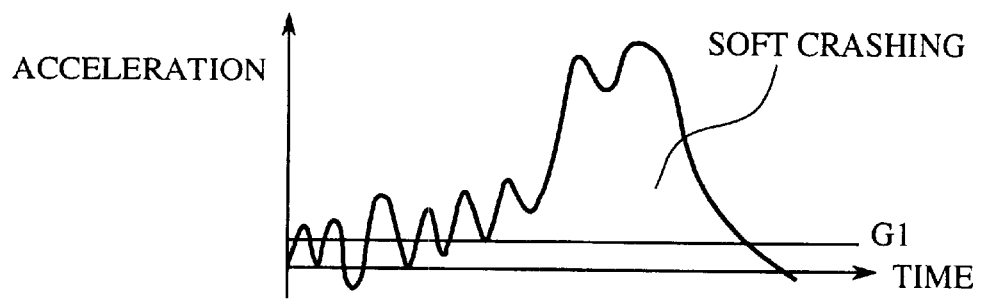
FIG. 8A is a graph showing the waveform of an acceleration signal and FIGS. 8B through 8D are waveforms at respective outputs in FIG. 6 at the time of soft crashing.
Figure 8B:
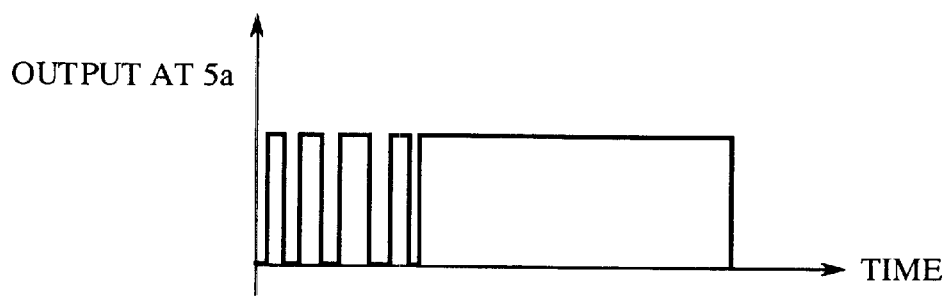
Figure 8C:
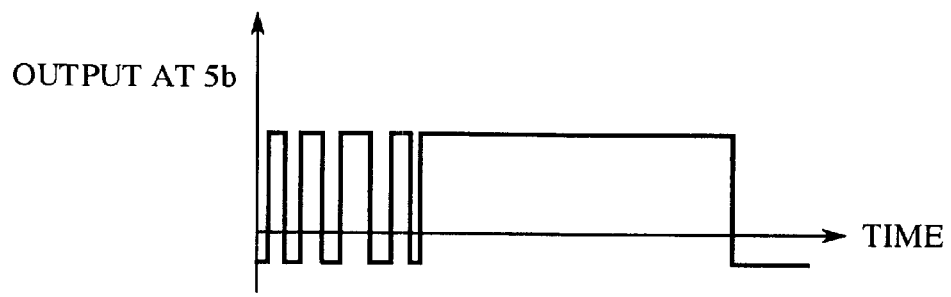
Figure 8D:
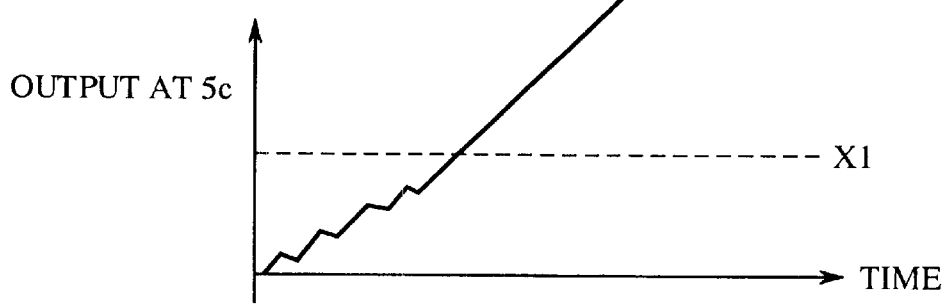
Figure 9A:
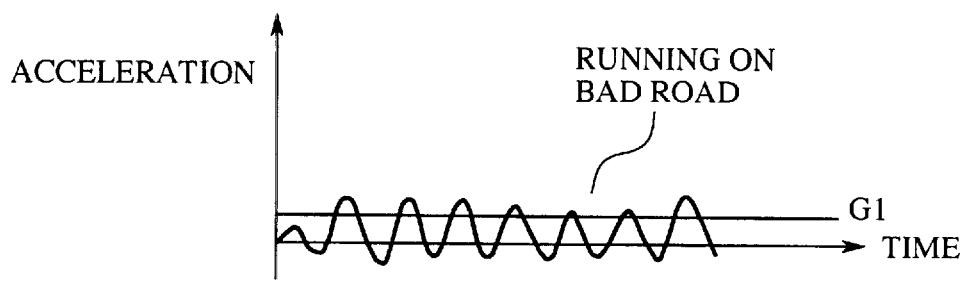
FIG. 9A is a graph showing the waveform of an acceleration signal and FIGS. 9B through 9D are waveforms at respective outputs in FIG. 6 at the time of running on a bad road.
Figure 9B:
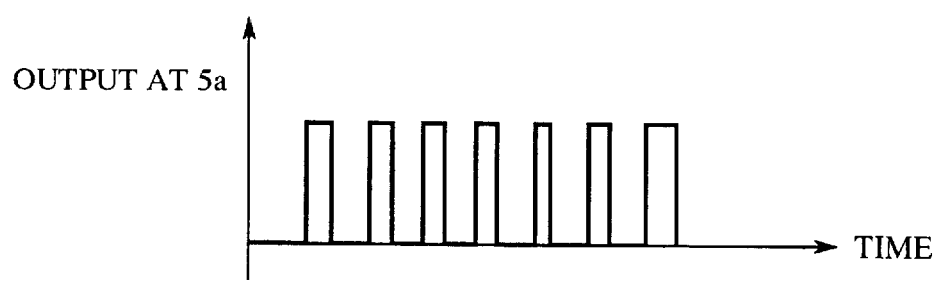
Figure 9C:
Figure 9D:
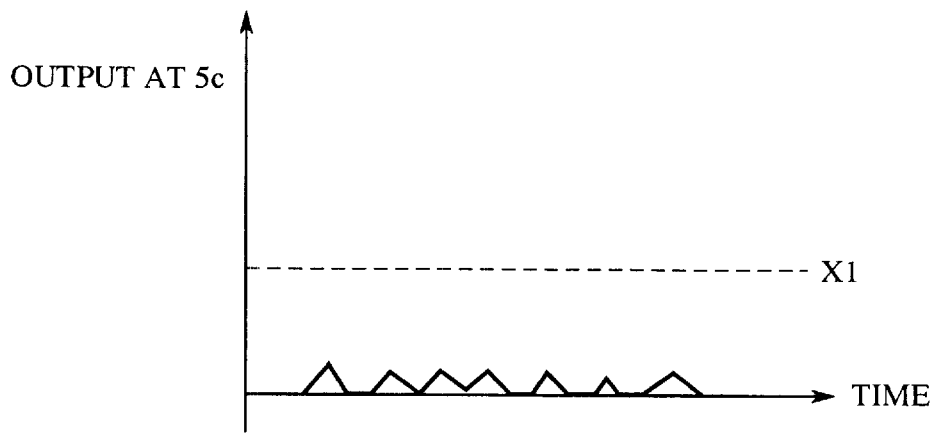
Figure 12:
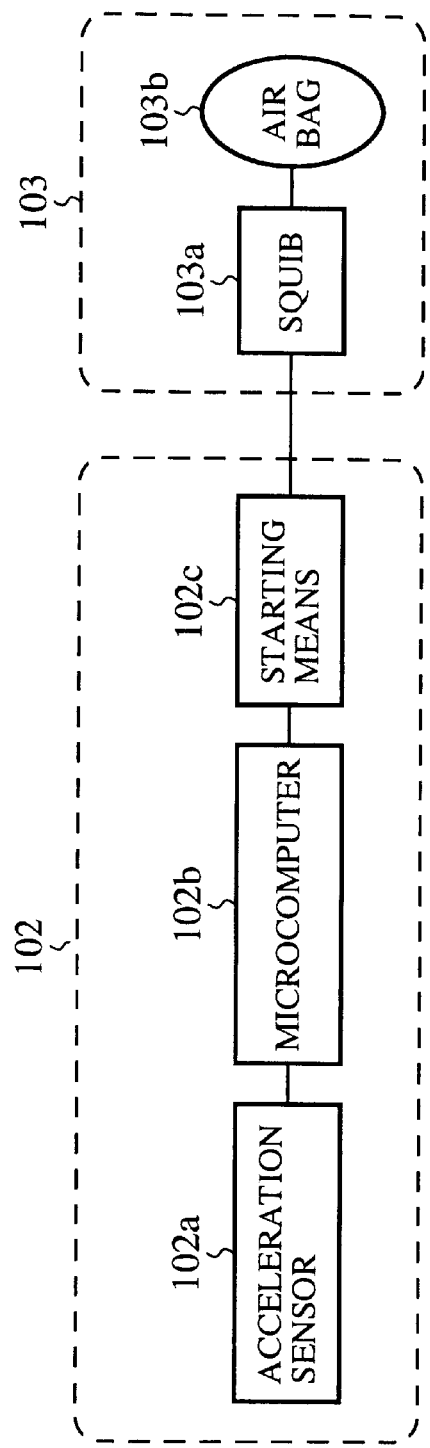
FIG. 12 is a block diagram of the system in FIG. 11.
Figure 13A:
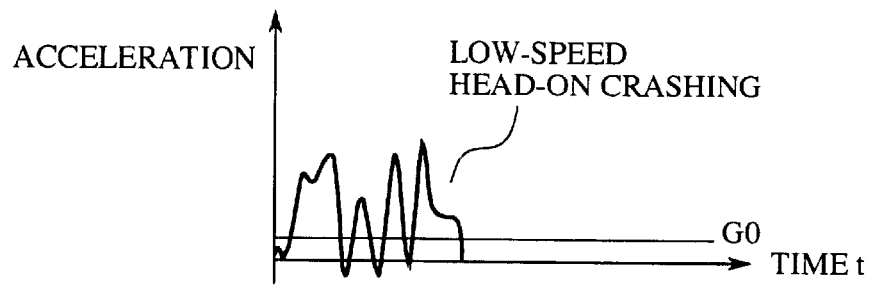
FIG. 13A is a graph showing the waveform of an acceleration signal and FIG. 13B is a waveform at respective outputs in FIG. 12 at the time of low-speed crashing.
Figure 13B:
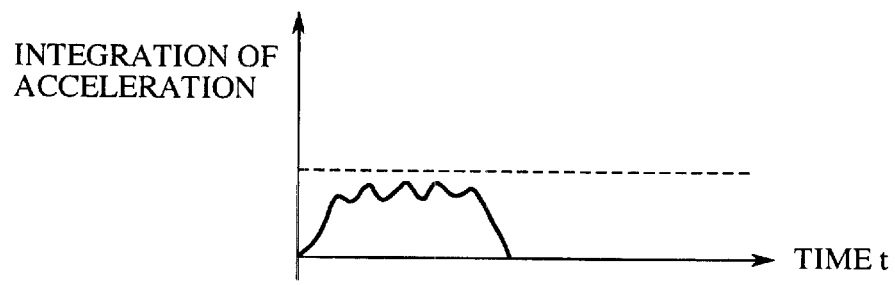
Figure 14A:
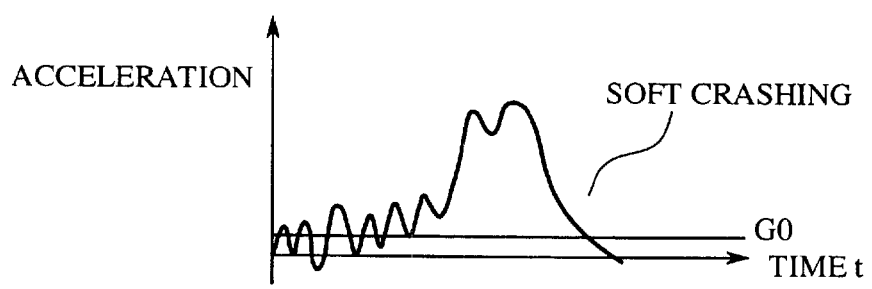
FIG. 14A is a graph showing the waveform of an acceleration signal and FIG. 14B is a waveform at respective outputs in FIG. 12 at the time of soft crashing.
Figure 14B:
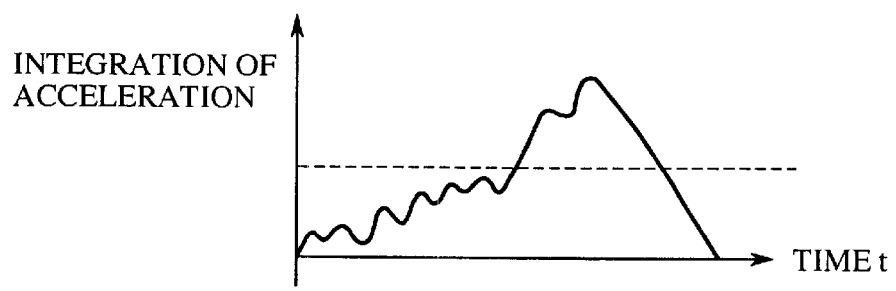

FIG. 6 shows a block diagram of embodiment 2 of the vehicle crash determining apparatus according to this embodiment. In this figure, reference numeral 5 denotes a crash determining means which corresponds to the microcomputer shown in FIG. 12. This crash determining means 5 is made up of: a first comparing means 5a which compares an acceleration signal Gt from the acceleration sensor (acceleration sensor 102a as shown in FIG. 12) which detects an impact at the time of crashing of the vehicle with the first threshold value G1; a subtracting means 5b which subtracts a predetermined constant value R1 from the output of the first comparing means 5a; an integrating means 5c which has a function of initializing to zero (hereinafter called a reset function) when an integrated value X of the output of the subtracting means 5b is smaller than zero; and a second comparing means 5d which determines as to whether the starting of the occupant protection means is necessary or not by comparing the integrated value of the integrating means 5c with the second threshold value X1.

A description will now be made about the operation of the above arrangement.

In the crash determining means, a determination is made by the first comparing means 5a as to whether the acceleration signal Gt detected by, and supplied from, the acceleration sensor is larger than the first threshold value G1 or not, and a subtraction is made by the subtracting means 5b of a constant value R1 that has been predetermined from an output of the first comparing means 5a. Then, the output of the subtracting means 5b is integrated by the integrating means 5c. The integrated value is compared by the second comparing means 5d with the second threshold value X1. If the integrated value is larger than the second threshold value X1, the crash determining result is outputted from the second comparing means 5d.

FIGS. 7A through 7D, 8A through 8D and 9A through 9D show waveforms of the acceleration signal and output waveforms at each of points 5a, 5b, 5c in FIG. 6 at the time of low-speed head-on crashing, soft crashing and running on a bad road, respectively. Like in embodiment 1, by integrating the time in which the acceleration signal Gt exceeds the threshold value G1, it becomes possible to quickly discriminate the soft crashing from the low-speed head-on crashing and the running on a bad road. Further, when the speed signal obtained by integrating after subtracting a constant value from the acceleration signal Gt is below zero, the integration is made by treating the speed signal to be zero. Therefore, there is no need of storing in memory the acceleration signal Gt as in the case of piecewise integration, resulting in an effect in that the memory to be used can be minimized and also that the time for determining the crashing can be shortened.

Like in the first threshold value G0 in the embodiment 1, by setting the first threshold value G1 to a value taking into consideration the braking for a long period of time, running on a bad road, noises in the acceleration sensor or the like, it becomes possible to prevent the wrong operation of the occupant protection means when it is not necessary to do so.

Embodiment 3

Embodiment 3 of this invention is arranged in such a way that, in the embodiments 1 and 2 as shown in FIGS. 1 and 6, a lowpass filter (LPF) is provided on an input side of the comparing means 4a, 5a, respectively. By employing this arrangement, a high-frequency component contained in the acceleration signal Gt is, attenuated, so that the determination of crashing can be made more stably.

Figure 10:
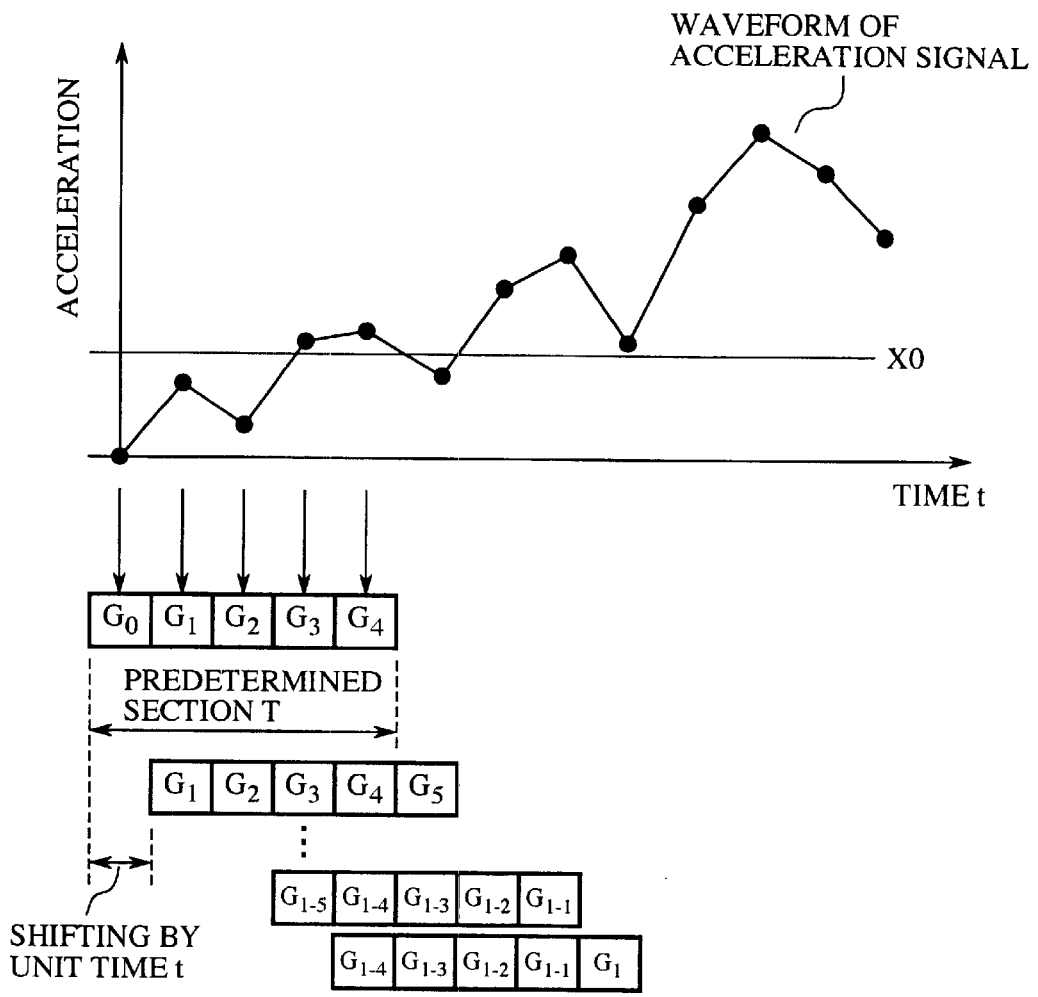
FIG. 10 is a graph for explanation of integration by sections.
Figure 11:
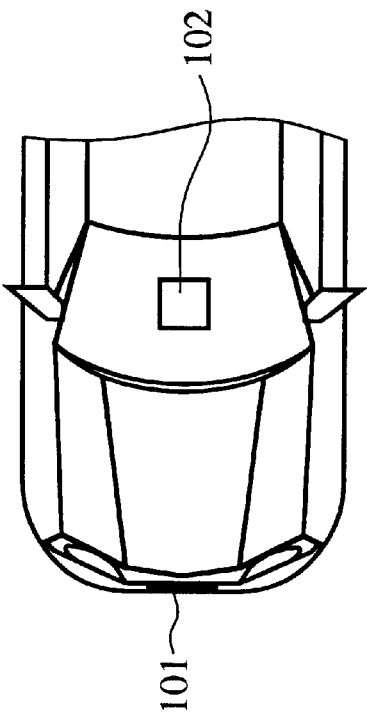
FIG. 11 is a plan view showing the position of disposing a vehicle crash determining means to be used in a conventional occupant protection system.

The integrating means 4b in embodiment 1 performs integration by sections. The principle of this integration by sections will be explained with reference to FIG. 10. Let a unit time t be made to correspond to 1 bit and 5 bits be defined as the predetermined section T. A determination is made as to whether there is an output at each of the corresponding bit positions for each of the predetermined sections T. If there is an output, "1" is plotted in the corresponding bit and the content of these 5 bits is integrated. In this manner, the integration of each of the predetermined sections T is sequentially performed by making a shift by a unit time t. When the integrated value has exceeded the second threshold value X0, the signal to initiate the occupant protection means is outputted.

As described hereinabove, according to this invention, since the vehicle crash determining apparatus is arranged to comprise: a first comparing means for comparing an output signal of an acceleration sensor for detecting an impact at a time of crashing of a vehicle with a first threshold value; a second comparing means for determining a necessity of starting an occupant protection means by comparing an accumulated value of an integrating means for accumulating an output of the first comparing means within a predetermined section while making a shift by a unit time with a second threshold value; and a starting means for controlling a starting of the occupant protection means based on an output signal of the second comparing means, there is an effect in that a determination can be made quickly as to whether the crash is of a mode which requires the starting of the occupant protection means.

According to another aspect of this invention, since there is provided a vehicle crash determining apparatus comprising: a first comparing means for comparing an output signal of an acceleration sensor for detecting an impact at a time of crashing of a vehicle with a first threshold value; a subtracting means for subtracting a predetermined constant value from an output of the first comparing means; an integrating means with a reset function for integrating an output of the subtracting means to thereby forcibly reset an integrated value thus obtained to zero when the integrated value falls below zero; a second comparing means for determining a necessity of starting an occupant protection means by comparing the integrated value of the integrating means with a second threshold value; and a starting means for controlling a starting of the occupant protection means based on an output signal of the second comparing means, there are effects in that it becomes possible to minimize the memory to be used, and that the determination can be made quickly as to whether the crash is of a mode which requires the starting of the occupant protection means.

According to this invention, since the apparatus of this invention preferably further comprises attenuating means for attenuating a high-frequency component in the output signal from the acceleration sensor to thereby input a resultant product into the first comparing means, the high-frequency component contained in the acceleration signal is attenuated and, therefore, there is an effect in that the vehicle crash determination can be made in a more stable manner.

It is readily apparent that the above-described vehicle crash determining apparatus meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A vehicle crash determining apparatus comprising:

an acceleration sensor for detecting an impact at a time of crashing of a vehicle;

a first comparing means for comparing an output signal of said acceleration sensor and a first threshold value;

an integrating means for integrating an output of said first comparing means within a predetermined section while making a shift by a unit time;

a second comparing means for determining a necessity of starting an occupant protection means by comparing an integrated value of said integrating means with a second threshold value; and a starting means for controlling a starting of said occupant protection means based on an output signal of said second comparing means.

2. A vehicle crash determining apparatus comprising:

an acceleration sensor for detecting an impact at a time of crashing of a vehicle;

a first comparing means for comparing an output signal of said acceleration sensor with a first threshold value;

a subtracting means for subtracting a predetermined constant value from an output of said first comparing means;

an integrating means with a reset function for integrating an output of said subtracting means to thereby forcibly reset an integrated value thus obtained to zero when the integrated value falls below zero;

a second comparing means for determining a necessity of starting an occupant protection means by comparing said integrated value of said integrating means and a second threshold value; and a starting means for controlling a starting of said occupant protection means based on an output signal of said second comparing means.

3. The vehicle crash determining apparatus according to claim 1, further comprising an attenuating means for attenuating a high-frequency component in the output signal from said acceleration sensor to thereby input a resultant product into said first comparing means.

4. The vehicle crash determining apparatus according to claim 2, further comprising an attenuating means for attenuating a high-frequency component in the output signal from said acceleration sensor to thereby input a resultant product into said first comparing means.

5. A vehicle crash determining apparatus comprising:

an acceleration sensor for detecting an impact at a time of crashing of a vehicle;

a first comparing circuit that compares an output signal of the acceleration sensor and a first threshold value;

an integrating circuit that integrates an output of the first comparing circuit within a predetermined section while making a shift by a unit time;

a second comparing circuit that determines a necessity of starting an occupant protection device by comparing an integrated value of the integrating circuit with a second threshold value; and a starting circuit that starts the occupant protection device based on an output signal of the second comparing circuit.

* * * * *